United States Patent [19]

Huisman et al.

[11] 4,349,385
[45] Sep. 14, 1982

[54] METHOD OF PREPARING A FEOOH PIGMENT

[75] Inventors: Hendrikus F. Huisman; Harm Jan Groen, both of Oosterhout, Netherlands

[73] Assignee: U.S. Philips Corporation, New York, N.Y.

[21] Appl. No.: 118,259

[22] Filed: Feb. 4, 1980

[30] Foreign Application Priority Data

Feb. 23, 1979 [NL] Netherlands ......................... 7901438

[51] Int. Cl.$^3$ .......................... B32B 15/04; C09K 3/00
[52] U.S. Cl. .................................... 106/37; 252/62.56; 428/329; 428/900; 428/694; 523/174
[58] Field of Search .................. 423/633, 634; 106/37, 106/304; 232/62.56; 260/37 M; 427/127; 428/329, 694, 692, 900

[56] References Cited

U.S. PATENT DOCUMENTS 3,382,174  5/1968  Hund .............................. 252/62.56
4,140,539  2/1979  Hund et al. ....................... 106/304
4,178,416  12/1979  Hector et al. .................... 252/62.56

OTHER PUBLICATIONS

Offenlegungsschrift 25 08 932, Sep. 1979, Hund.
Offenlegungsschrift 21 62 716, Jun. 1973, Leitner et al.
"Purification of Iron Oxide [$Fe_2O_3$]," Mitani et al., Chem. Abstr., vol. 82, 1975, p. 615, Abstract No. 148826n.

Primary Examiner—Theodore Morris
Attorney, Agent, or Firm—Marc D. Schechter

[57] ABSTRACT

The invention relates to a method of manufacturing an improved pigment of FeOOH particles. The starting material is an acidic or alkaline aqueous dispersion of FeOOH particles which has been manufactured according to known methods. According to the invention, a water-soluble ammonium salt, which is derived from a low-molecular weight, weakly acidic organic acid and which volatilizes either as such or after decomposition not greater than 450° C., is added to the aqueous dispersion. As a result of the addition of the ammonium salt, the FeOOH pigment flocculates. It is then separated and washed with water which preferably is also provided with the ammonium salt. According to a further embodiment of the invention the resulting pigment which, after drying, has a very low salt content, is converted into an Fe pigment or a $\gamma$-$Fe_2O_3$ pigment which also has a very low salt content. A magnetic recording element which is based on the Fe or $\gamma$-$Fe_2O_3$ pigment obtained according to the invention has improved life properties in particular when used or stored in a humid environment.

9 Claims, No Drawings

METHOD OF PREPARING A FEOOH PIGMENT

BACKGROUND OF THE INVENTION

The invention relates to a method of preparing a FeOOH pigment, in which the pigment is separated from an aqueous dispersion of FeOOH particles. The FeOOH particles are obtained according to a known process and are then washed with water.

A FeOOH pigment is a nonmagnetic pigment known by the name of goethite or lepidocrocite which forms an important starting product for the preparation of magnetic pigments, for example a pigment of magnetic Fe particles or a pigment of magnetic $\gamma$-$Fe_2O_3$ particles. Such magnetic pigments may be used in magnetic recording elements, in particular magnetic tapes, which comprise a carrier in the form of a disc or tape usually manufactured from a synthetic resin. A magnetic coating is provided on the carrier. The coating comprises a binder in which the pigment particles are finely distributed by using a dispersing agent.

The above-mentioned known aqueous dispersion of FeOOH particles can be prepared in several ways. Depending on the preparation process used, the aqueous dispersion is either acidic or alkaline.

A well known preparation process is the so-called acid or Camras process. According to this process an aqueous acid solution of ferrosulphate is obtained by dissolving elementary iron in sulphuric acid. The solution is then made alkaline by the addition of, for example, sodium hydroxide solution. In this alkaline medium, formation of $\alpha$-FeOOH (goethite) seeds takes place.

The seed solution is acidified by the addition of sulphuric acid with iron and in the resulting acid medium goethite crystals grow on the seeds.

According to another well known process of preparing an aqueous dispersion of goethite crystals or particles (the so-called alkaline process) a sulphuric acid solution of ferrosulphate is made alkaline, as in the above-mentioned Camras process. Seed formation takes place in the alkaline medium. The seed solution is then acidified in such manner that the alkalinity of the seed solution is reduced but an alkaline medium remains. In this weakly alkaline medium the growth of goethite crystals takes place.

According to still another process (the so-called lepidocrocite process) the starting solution is a hydrochloric acid solution of ferro chloride. This solution is made alkaline and is then acidified. In this process, $\gamma$-FeOOH crystals, lepidocrocite crystals, are obtained.

The FeOOH particles, and consequently also the magnetic Fe or $\gamma$—$Fe_2O_3$ particles manufactured therefrom, may be doped with metals, for example Co, Ni, Zn, Sn, Ti or combinations thereof. Such a doped pigment can be manufactured in the usual manner by adding salts of the desired metals, for example cobalt sulphate, or zinc sulphate, to the above-mentioned sulphuric acid or hydrochloric acid reaction medium. The filtered FeOOH particles may also be provided with such salts.

The terms FeOOH, Fe and $\gamma$—$Fe_2O_3$ particles or pigments used in this specification are to be understood to also include such particles or pigments which are doped with metals such as Co, Ni, Zn, Sn and Ti.

From the alkaline or acidic aqueous dispersion of FeOOH particles obtained according to the above-mentioned methods, the FeOOH pigment is separated by filtration or, for example by, decanting.

Experiments have demonstrated that the alkaline or acidic dispersion of FeOOH particles has a colloidal character and that the separation of the particles, for example by filtration, is very laborious. The dispersion passes through the filter until the filter is clogged by the coarser particles present in the dispersion and a filter cake has built up.

After filtering off the particles, the pigment is washed with water and, if desired, dried thereafter at up to 200° C. The washing water is described, inter alia, in German Offenlegungsschrift No. 2,054,254.

By the addition of a net-like polymeric flocculant, for example the known polyacrylamide, to the aqueous dispersion of FeOOH particles to be separated, the filtration or decanting process beomes easier. However, Applicants have found that the polyacrylamide does not entirely disappear during the conversion of the FeOOH pigment into the magnetic Fe or $\gamma$—$Fe_2O_3$ pigment, which conversion is performed at higher temperature (300°–450° C.). Hydrocarbon residues, for example carbon particles, originating from the polyacrylamide are present in the magnetic final product and adversely influence the magneto-acoustical properties of the pigment.

A further disadvantage of the known method is that the salt content of the resulting FeOOH particles is high. These salts are bonded electrostatically to the surfaces of the particles, and are in particular, salts of the slightly heavier alkali metals such as iron sulphate, zinc sulphate, calcium sulphate and calcium chloride.

It has been found that when the FeOOH pigment has a comparatively high salt content, the result is that the magnetic Fe and $\gamma$—$Fe_2O_3$ pigments obtained from the FeOOH pigment also has a comparatively large quantity of salts bonded electrostatically to the particles' surfaces. When such pigments are processed in magnetic recording elements, the magnetic recording quality of the recording elements is reduced in the long run and in particular upon storage or use in a humid environment. For example, the quality of a signal such as an audio signal, provided on such a recording element degrades significantly in the long run. It is believed that this poor behavior is the result of a gradual deposition of salt on the surface of the magnetic coating of the recording elements. The salts are believed to originate from the surfaces of the particles of pigment dispersed in the magnetic coating. In a humid environment, water may condense in the micropores which are present in the magnetic coating so that the salts bonded to the surfaces of the pigment particles gradually go into solution. As a result of physical transport phenomena, the salts in the pores, are transported to the surface of the coating and crystallize out there by the evaporation of the water.

SUMMARY OF THE INVENTION

The invention relates to a method of the type described above in which a water-soluble ammonium salt is added to the aqueous dispersion. The ammonium salt is one which is derived from a low-molecular weight, weakly acidic organic acid and which volatilizes, either as such or after decomposition, at a temperature of at most 450° C. The term low-molecular weight relates to a molecular weight of at most 150.

By means of the ammonium salt addition according to the invention, the FeOOH particles distributed in the aqueous dispersion easily flocculate without the addition of a specific polymeric flocculant. As a result, the FeOOH particles can be separated without any loss of material, for example filtering or decanting.

Furthermore, the salt content at the surfaces of the separated FeOOH particles is very small. By way of example, the salt content of FeOOH particles processed according to the invention is lower than 0.1 percent by weight, for example 0.03 percent by weight.

If the aqueous dispersion of the FeOOH particles is acidic, for example a dispersion of FeOOH particles prepared according to the above-mentioned Camras process, in a preferred form of the method according to the invention a water-soluble base is also added to the dispersion, in addition to the water-soluble ammonium salt. The quantity of added base is not restricted to narrow limits. In a preferred embodiment so much of the base is added that the acidity (pH) of the aqueous dispersion without ammonium salts is from 6–9.

Suitable bases are the alkali metal hydroxides for example NaOH and KOH. The use of ammonia is to be preferred.

By means of the method according to the invention, the salts which are initially bonded to the surfaces of the particles FeOOH are exchanged with the ammonium salt. The ammonium salt, however, can be easily removed by subjecting the resulting pigment to a temperature treatment, for example heating to 150°–200° C. Such a temperature treatment may be, for example, a drying process performed after washing the pigment. Alternatively, the temperature treatment may be carried out automatically during the process, the FeOOH pigment being converted into a magnetic Fe or $\gamma$—$Fe_2O_3$ pigment.

The exchange of the initially bonded salts for the ammonium salt and also the associated loss of the colloidal character of the dispersion occur very effectively. It is believed that this is because the dispersed FeOOH particles approach or reach the isoelectric point by adding the ammonium salt according to the invention so that the strong electrostatic bonding of the charged particles and the surrounding fields of ions and complementary ions is reduced. In this connection it is to be noted that the particles have a positive charge in an acid medium and have a negative charge in a basic medium.

In a preferred embodiment of the method of the invention, a water-soluble ammonium salt, which is derived from a low-molecular weight, weakly acidic organic acid and which volatilizes, either as such or after decomposition, at a temperature of at most 450° C., is also added to the wash water. By adding such an ammonium salt to the wash water, other salts which are present at the surfaces of the FeOOH particles are effectively exchanged with the ammonium salt. Furthermore, normal water, that is to say wash water which is not deionized or is semideionized, can now be used for washing the FeOOH particles. In addition, the particles can be washed at the normal ambient temperature which roughly is from 20°–25° C.

The quantity of ammonium salt added to the aqueous dispersion or to the wash water is not critical. Good results are achieved if 1–55 g of ammonium salt are added per 100 g of pigment.

Suitable ammonium salts are, for example, triethanol ammonium acetate, ammonium acetate, ammonium oxalate, ammonium carbonate or mixtures thereof. The addition of ammonium acetate, for example, gives excellent results.

In a further elaboration of the method of the invention the improved FeOOH pigment is converted in known manner into an improved magnetic Fe pigment or $\gamma$—$Fe_2O_3$ pigment.

For example, an improved iron powder (Fe) pigment is obtained by reducing the improved FeOOH pigment obtained according to the invention with hydrogen at elevated temperature. The temperature at which the reduction process is carried out is roughly from 350°–450° C. As a result of this temperature treatment, the ammonium salt present at the suraces of the particles of FeOOH pigment will volatilize either as such or after decomposition.

An improved $\gamma$—$Fe_2O_3$ pigment is obtained by reducing the improved FeOOH pigment prepared according to the invention at elevated temperature of approximately 350°–450° C. The pigment is reduced with hydrogen to form magnetite. The magnetite is ($Fe_3O_4$) then oxidized at elevated temperature of approximately 300°–350° C. to form $\gamma$—$Fe_2O_3$ pigment which is dispersed in water. The $\gamma$—$Fe_2O_3$ is separated from the dispersion, washed with water and finally dried. The drying process is carried out in air at a temperature of at most 200° C.

According to a preferred embodiment of the invention, in the above-described method of preparing an improved $\gamma$—$Fe_2O_3$ pigment, a water-soluble ammonium salt, which is derived from a low-molecular weight, weakly acidic organic acid and which volatilizes either such or after decomposition in the drying process used, is added to the aqueous dispersion of the $\gamma$—$Fe_2O_3$ pigment and/or to the wash water.

According to this embodiment a very pure $\gamma$—$Fe_2O_3$ pigment is obtained which contains no or substantially no absorbed salt. Moreover, by the addition of the ammonium salt to the aqueous dispersion, the dispersed $\gamma$—$Fe_2O_3$ pigment will easily flocculate and can be separated by filtering or decanting.

A suitable ammonium salt is, for example, ammonium acetate, ammonium oxalate, or ammonium carbonate. The quantity of ammonium salt used is approximately 1–2 g per 100 g of pigment.

The invention further relates to a magnetic recording element. The magnetic coating comprises a carrier and a magnetic coating provided thereon which comprises a binder and a magnetic Fe or $\gamma$—$Fe_2O_3$ pigment finely distributed therein by using a dispersing agent. An improved magnetic Fe or $\gamma$—$Fe_2O_3$ pigment is used which has been obtained according to the above-described methods of the invention.

The recording element may be manufactured by thoroughly grinding and mixing in a ball mill for several hours the pigment, the binder, the dispersing agent and possible auxiliary substances, for example antistatic agents, antioxidants, lubricants, and the like, together with a solvent for the binder. If desired, a part of the ingredients, for example a part of the binder and solvent, may be added in a second batch to the contents of the ball mill. The resulting dispersion is sieved and then provided on a carrier in a uniform layer.

Frequently used binders are, for example, polyvinyl chloride, polyvinyl acetate, polyester, polyester amide, polyacrylate, polyurethane or copolymers of at least two monomers which are selected, for example, from vinyl chloride, vinyl acetate, acrylonitrile, vinyl alcohol, vinyl butyral and vinylidene chloride. The dispersing agent is used in a quantity of 0.5–6 percent by weight of the pigment. A suitable dispersing agent is, for example, lecithine, mono- or diesters of phosphoric acid and ethoxylated alcohols, as well as alkyl aryl sulphonic acids. The auxiliary substances are present in a quantity by weight of 0.1–10% of the binder. Useful auxiliary substances are, for example, lubricants, such as fatty acids, fatty acid derivatives, silicone oil, and vaseline, as well as antistatic agents such as soot. The quantity of pigment is approximately 60–80% by weight of the overall weight of the magnetic coating.

DESCRIPTION OF THE PREFERRED EMBODIMENTS

The invention will now be described in greater detail with reference to the following specific examples.

EXAMPLE 1.

The starting material in this example is an acidic aqueous dispersion of FeOOH particles obtained according to the Camras process. The pH value of the dispersion is 3.0. By the addition of $SnCl_2$ to the reaction mixture according to the Camras process, FeOOH particles were obtained which were doped with atomic % of Sn in the form of $SnCl_2$ calculated based on the Fe content of the dispersion. Next, 10 l of $NH_3$ gas was mixed into the dispersion containing 1000 g of FeOOH until the pH value was 8.0. 30 g of ammonium acetate were then added to the dispersion while stirring. The pigment flocculated nearly immediately. The assembly was stirred for another hour, then decanted without any loss of material and the resulting FeOOH pigment was stirred twice with 10 l of nondeionized water at 20° C. 1.5 g of ammonium acetate per liter had been added to the wash water. The decanted FeOOH pigment was dried in air at 150° C., the ammonium acetate absorbed on the pigment volatilizing. The pigment, after drying, contained 0.04% by weight of absorbed salt.

The FeOOH pigment was reduced in the usual manner at 350° C. with hydrogen to a magnetic Fe pigment which contained 1 atomic % Sn, and was then stabilized by a treatment with a $N_2/O_2$ gas mixture in which the Fe particles were provided with a thin oxide skin.

A comparison pigment was manufactured according to the current method by decanting 10 l of the above-mentioned acidic aqueous dispersion of $SnCl_2$-doped FeOOH particles. The dispersion had a pH value of 3.0 and contained 100 g of FeOOH per liter. The decanting process proceeded laboriously and caused a significant loss of material. The decanted pigment was stirred twice with 10 l of deionized water, separated again by decanting, then dried in air at 150° C. The dried pigment was then converted in the above-described manner into a stabilized magnetic Fe-pigment containing 1 atomic % Sn.

Both the pigment manufactured according to the invention and the comparison pigment were processed to a magnetic tape in the following manner.

The following ingredients were introduced in a so-called "High Speed Dissolver" (which is a mixer having a stirrer formed by a rotatable circular plate which at its edge has lugs projecting alternately above and below the plane of the plate):

38 parts by weight of a 17% solution of a polyester urethane resin obtained from adipic acid, 1,4-butanediol and 4,4-diisocyanodiphenylmethane (trade name "Estane"), in tetrahydrofuran.

5.5 parts by weight of a 30% solution of phenoxy resin type PHKJ of Union Carbide) in tetrahydrofuran.

1.8 parts by weight of silane (type A 143 of Union Carbide) and 300 parts by weight of tetrahydrofuran.

The whole mixture was stirred for 2 hours while the following ingredients were gradually added:

175 parts by weight of Fe-pigment 1 4 parts by weight of $Al_2O_3$ 6.5 parts by weight of electrically conductive soot, and 7 parts by weight of Na-salt of lauryl sarcosine.

After adding all the ingredients in the course of the above-mentioned 2 hours, stirring was continued for another 30 minutes after which the ingredients were mixed and ground in a pearl mill with glass pearls having a diameter of 1 mm.

150 parts by weight of the above-mentioned polyester urethane resin solution as well as 22 parts by weight of the above-mentioned phenoxy resin solution were added to the rotating pearl mill and then ground for another 24 hours.

The resulting magnetic coating lacquer was sieved through a filter having a mesh width of $3\mu$ and provided on a polyester foil having a thickness of $12\mu$. After drying and calendering the resulting magnetic tape, a sound signal of 6.3 kHz was recorded on it. The tape was then subjected to a cyclic moisture test.

For the moisture test, the tape was stored for 21 days under varying environmental conditions. The tape spent periods of 23 hours at a temperature of 40° C. and at a relative humidity of 95%, alternated with periods of 1 hour at a temperature of 20° C. and a relative humidity of 50%.

After the period of 21 days, the tape was removed from the test apparatus and played back on the usual playback apparatus. The tape was moved at a rate of 4.75 cm/sec past a playback head. The resulting signal was compared with the originally recorded signal.

It has been found that the magnetic tape having the Fe pigment processed according to the invention demonstrated no observable loss of signal. The magnetic tape having the comparison pigment demonstrated a loss of signal of 2–6 dB distributed over the tape.

EXAMPLE 2.

In this example the starting product was an alkaline aqueous dispersion of FeOOH particles manufactured according to the alkaline process and having a pH value of 9.0 5 g of ammonium acetate were added, while stirring, to 5 l of this dispersion which contained 40 g of the FeOOH pigment per liter. The pH of the dispersion increased to a value of approximately 7. The pigment flocculated nearly immediately. Stirring was continued for another hour. The pigment was filtered, without any significant loss of material, with a $10\mu m$ filter, and was washed on the filter twice with 5 liters of nondeionized water at 20° C. Ammonium acetate had been added to the wash water in an amount of 0.5 grams per liter. The pigment was then dried in air at 120° C. The ammonium salt absorbed on the pigment volatilized during the drying process. The resulting FeOOH pigment had a salt content of 0.04% by weight.

The FeOOH pigment was converted in the usual manner into a magnetic $\gamma—Fe_2O_3$ pigment. For this purpose the FeOOH pigment was reduced with hydrogen at a temperature of approximately 300° C. to magnetite ($Fe_3O_4$), and was then oxidized in air at approximately 250° C. to magnetic $\gamma—Fe_2O_3$ pigment.

The γ—$Fe_2O_3$ pigment was mixed with 2 l of water, and 2 g of ammonium acetate were then added to the resulting dispersion.

The mixture was stirred and the pigment flocculated. The pigment was filtered, without loss of material, through a 10 μm filter, was washed two times with 2 liters of nondeionized water at 20° C. (to which 0.5 g of ammonium acetate had been added per liter), and was then dried in air at 130° C. The resulting pigment had a salt content of 0.02% by weight.

A comparison pigment of γ—$Fe_2O_3$ particles was manufactured in the usual manner by adding a flocculant (polyacrylamide) to 5 l of the above-mentioned alkaline aqueous dispersion of FeOOH particles. The dispersion had a pH value of 9.0 and contained 40 g of pigment per liter. The dispersion was then filtered, to remove the flocculated FeOOH pigment, through a 10 μm filter. The filtration ran off without a substantial loss of material. The filtered pigment was washed twice with 5 l of deionized water, and was then dried in air at 120° C. The resulting FeOOH pigment was converted, in the above-described manner by reduction of hydrogen followed by oxidation in air, into a γ—$Fe_2O_3$ pigment. The pigment was then dispersed in 2 liters of deionized water, stirred and then filtered through a 10 μm filter. The filtration ran off slowly and with a significant loss of material. The pigment was washed twice with 2 l of deionized water at 90° C., and was then dried in air at 130° C.

Both the γ—$Fe_2O_3$ pigment obtained according to the invention and the comparison pigment of γ—$Fe_2O_3$ were processed to form a magnetic tape in the following manner.

The following ingredients were introduced into a ball mill:

95 parts by weight of γ—$Fe_2O_3$
3.85 parts by weight of lecithine
40 parts by weight of tetrahydrofuran
15.5 parts by weight of cyclohexanone and
64.4 parts by weight of methyl isobutyl ketone.

The ingredients were mixed for two hours while 52.4 parts by weight of a 20% solution of polyurethane resin in a mixture (1:1) of tetrahydrofuran and cyclohexanone, as well as 69.9 parts by weight of a 30% solution of vinylidenechloride-acrylonitrile copolymer (8:2) in a mixture (1:1) of tetrahydrofuran and cyclohexanone, as well as 33.1 parts by weight of methyl isobutyl ketone were added. The mixture was ground for several hours until a particle size smaller than 2–3 μm had been reached. The product was drained off, filtered and provided on a 12 μm thick foil of polyethylene terephthalate. The assembly of the fore carrier and the magnetic coating was dried and calendered. The ultimate thickness was the magnetizable coating of 6 μm.

A sound signal of 6.3 kHz was provided on the resulting magnetic tape. Afterwards, the tape was subjected, in the manner described in example 1, to a cyclic moisture test, and was then played back.

It has been found that the magnetic tape in which the pigment had been processed according to th invention showed no loss of signal, whereas the tape having the comparison pigment showed a loss of signal which varied over the tape from 2 to 6 dB.

What is claimed is:

1. A method of processing FeOOH particles comprising the steps of:
   preparing an aqueous dispersion of FeOOH particles;
   separating the FeOOH particles from the aqueous dispersion;
   washing the separated FeOOH particles with water; and
   drying the washed FeOOH particles;
   CHARACTERIZED IN THAT prior to separating the FeOOH particles from the aqueous dispersion, a water-soluble ammonium salt, which is derived from a low molecular weight, weakly acidic organic acid and which volatilizes or decomposes and then volatilizes at a temperature up to 450° C., is added to the aqueous dispersion.

2. A method as claimed in claim 1, CHARACTERIZED IN THAT prior to separating the FeOOH particles from the aqueous dispersion, a water-soluble base is also added to the aqueous dispersion.

3. A method as claimed in claim 2, CHARACTERIZED IN THAT prior to the step of washing, a water-soluble ammonium salt, which is derived from a low molecular weight, weakly acidic organic acid and which volatilizes or decomposes and then volatilizes at a temperature up to 450° C., is added to the wash water.

4. A method as claimed in claim 3, CHARACTERIZED IN THAT 1–5 grams of the ammonium salt are added per 100 grams of aqueous dispersion.

5. A method as claimed in claim 4, CHARACTERIZED IN THAT the ammonium salt is one or more salts from the group of ammonium acetate, ammonium oxalate, and ammonium carbonate.

6. A method as claimed in claim 5, CHARACTERIZED IN THAT the method further comprises the step of reducing the dried FeOOH particles at an elevated temperature to produce magnetic Fe pigment.

7. A method as claimed in claim 5, CHARACTERIZED IN THAT the method further comprises the steps of:
   reducing the dried FeOOH particles at an elevated temperature to produce magnetite; and
   oxidizing the magnetite at an elevated temperature to produce γ—$Fe_2O_3$.

8. A magnetic recording element comprising a carrier and a magnetic coating on the carrier, said magnetic coating comprising a binder, a dispersing agent, and magnetic Fe particles, said magnetic Fe particles being produced by the steps of:
   preparing an aqueous dispersion of FeOOH particles;
   adding to the aqueous dispersion of FeOOH particles a water-soluble ammonium salt which is derived from a low molecular weight, weakly acidic organic acid and which volatilizes or decomposes and then volatilizes at a temperature up to 450° C.;
   separating the FeOOH particles from the aqueous dispersion;
   washing the separated FeOOH particles with water;
   drying the washed FeOOH particles; and
   reducing the dried FeOOH particles at an elevated temperature to produce magnetic Fe pigment.

9. A magnetic recording element comprising a carrier and a magnetic coating on the carrier, said magnetic coating comprising a binder, a dispersing agent, and γ—$Fe_2O_3$ particles, said magnetic γ—$Fe_2O_3$ particles being produced by the steps of:
   preparing an aqueous dispersion of FeOOH particles;
   adding to the aqueous dispersion of FeOOH particles a water-soluble ammonium salt which is derived from a low molecular weight, weakly acidic organic acid and which volatilizes or decomposes and then volatilizes at a temperature up to 450° C.;

separating the FeOOH particles from the aqueous dispersion;
washing the separated FeOOH particles with water;
drying the washed FeOOH particles;
reducing the dried FeOOH particles at an elevated temperature to produce magnetite; and
oxidizing the magnetite at an elevated temperature to produce $\gamma$—$Fe_2O_3$.

* * * * *